United States Patent
Pellini et al.

(10) Patent No.: US 10,452,042 B2
(45) Date of Patent: Oct. 22, 2019

(54) SYSTEMS FOR CONTROLLING VENETIAN BLINDS

(71) Applicant: Pellini S.p.A., Codogno (IT)

(72) Inventors: Alessandro Pellini, Codogno (IT); Marco Passoni, Copiano (IT)

(73) Assignee: PELLINI S.P.A. (IT)

( * ) Notice: Subject to any disclaimer, the term of this patent is extended or adjusted under 35 U.S.C. 154(b) by 75 days.

(21) Appl. No.: 15/748,378

(22) PCT Filed: Jul. 28, 2016

(86) PCT No.: PCT/IB2016/054517
§ 371 (c)(1),
(2) Date: Jan. 29, 2018

(87) PCT Pub. No.: WO2017/017634
PCT Pub. Date: Feb. 2, 2017

(65) Prior Publication Data
US 2018/0275623 A1    Sep. 27, 2018

(30) Foreign Application Priority Data
Jul. 30, 2015   (IT) .................. 102015000040158

(51) Int. Cl.
G05B 19/042   (2006.01)
G08C 19/02    (2006.01)
H04B 3/54     (2006.01)

(52) U.S. Cl.
CPC .......... G05B 19/042 (2013.01); G08C 19/02 (2013.01); H04B 3/548 (2013.01);
(Continued)

(58) Field of Classification Search
CPC .. G05B 2219/25132; G05B 2219/2628; G05B 2219/2642; G05B 2219/2653;
(Continued)

(56) References Cited
U.S. PATENT DOCUMENTS 6,069,465 A * 5/2000 de Boois ............. G05B 19/042
                                                    318/41
8,950,461 B2 * 2/2015 Adams ..................... E06B 9/32
                                                    160/84.02
(Continued)

FOREIGN PATENT DOCUMENTS

FR    2692418 A1    12/1993

OTHER PUBLICATIONS

International Search Report and Written Opinion dated Oct. 13, 2016, in corresponding PCT Application No. PCT/IB2016/054517, 11 pages.

*Primary Examiner* — Daniell L Negron
*Assistant Examiner* — Mancil Littlejohn, Jr.
(74) *Attorney, Agent, or Firm* — MH2 Technology Law Group LLP

(57) ABSTRACT

The present disclosure concerns a system for driving a Venetian blind comprising a blind assembly which comprises a Venetian blind, an electric motor for actuating the movement of said Venetian blind and first electronic means configured to generate a drive signal for driving said electric motor; a control unit having drive means for driving the movement of said Venetian blind, a power source for generating a current signal to power said electric motor and second electronic means that are in signal communication with said drive means and with said power source for controlling said electric motor; a two-wire power line disposed between said control unit and said blind assembly to power said electric motor with said current signal and the first electronic means are in signal communication with said second electronic means via said two-wire power line. The system is characterized in that the first electronic means are configured to generate a first data signal identifying the state of said electric motor and to detect a current signal in said two-wire power line identifying the current value absorbed (Continued)

by said electric motor; said second electronic means are configured to receive said first data signal and to detect said current signal, said second electronic means are configured to condition said first data signal and said current signal to thereby generate a second data signal;

said first electronic means are configured to receive said second data signal and to condition said second data signal and said current signal, said drive signal being generated as a function of said second data signal.

10 Claims, 3 Drawing Sheets

(52) U.S. Cl.
CPC .............. *G05B 2219/25132* (2013.01); *G05B 2219/2628* (2013.01); *G05B 2219/2642* (2013.01); *G05B 2219/2653* (2013.01); *H04B 2203/5416* (2013.01); *H04B 2203/5458* (2013.01)

(58) Field of Classification Search
CPC .... G05B 2219/5416; G05B 2219/5458; G05B 19/042; G05B 19/02; H04B 2203/5416; H04B 2203/5458
See application file for complete search history.

(56) References Cited

U.S. PATENT DOCUMENTS

| | | | |
|---|---|---|---|
| 9,071,339 B2* | 6/2015 | Oldenkamp | H04B 3/54 |
| 9,810,020 B2* | 11/2017 | Adams | E06B 9/72 |
| 2008/0061948 A1 | 3/2008 | Perez | |
| 2008/0260363 A1* | 10/2008 | Carmen | E06B 9/68 |
| | | | 388/811 |
| 2009/0125148 A1* | 5/2009 | Koot | G05B 19/042 |
| | | | 700/275 |
| 2010/0146423 A1 | 6/2010 | Duchene | |

* cited by examiner

SYSTEMS FOR CONTROLLING VENETIAN BLINDS

CROSS-REFERENCE TO RELATED APPLICATION(S)

This application is a national stage entry from International Application No. PCT/IB2016/054517, filed on Jul. 28, 2016, in the Receiving Office ("RO/IB") of the International Bureau of the World Intellectual Property Organization ("WIPO"), and published as International Publication No. WO 2017/017634 A1 on Feb. 2, 2017; International Application No. PCT/IB2016/054517 claims priority from Italian Patent Application No. 102015000040158, filed on Jul. 30, 2015, in the Italian Patent and Trademark Office ("IPTO"), the entire contents of all of which are incorporated herein by reference.

FIELD OF THE INVENTION

The present disclosure relates to a system for driving a blind as defined in the preamble of claim 1.

Venetian blind driving systems are known, which may be used, for example, for outdoor Venetian blinds, indoor Venetian blinds or Venetian blinds interposed between the glass panes of a window (so-called Venetian blinds in insulating glazing).

Preferably but without limitation, the present invention relates to Venetian blind driving systems that may be integrated between the glass panes of a window.

Discussion of the Related Art

Prior art Venetian blind driving systems usually comprise a blind assembly and a drive unit which is external or separated from the blind assembly, but is connected to the blind assembly via a two-wire (or conductor) power line.

Particularly, the blind assembly comprises a Venetian blind, an electric motor for actuating the movement of the Venetian blind, and an electric circuitry for controlling said electric motor, whereas the control unit comprises drive means for driving the movement of the Venetian blind, a power source and an additional electric circuitry for controlling the power source.

In these Venetian blind driving systems DC motors controlled through the power line are conventionally used in the blind assembly. By changing poles through the electric circuitry in the aforementioned control unit the direction of rotation of the motor may be reversed and the Venetian blind may be moved, and such pole change is recognized by the electronic circuitry of the blind assembly which accordingly drives the rotation of the motor in either direction.

Prior Art Problem

Nevertheless, in the above discussed prior art systems, in order to implement drive controls that are more complex than simple blind movement and speed drive controls, the control unit must be also equipped with additional electronic devices, both on the blind assembly side and on the control unit side. Particularly, these additional electronic devices require one or more additional electric connection wires between the drive unit and the blind assembly, in addition to the two wires that are already provided for supplying power to the electric motor of the blind.

The addition of one or more wires clearly involves the need for an additional electric connection in the blind assembly and, as a result, for an additional processing step for accommodating such additional wire in the blind assembly.

Such processing step requires longer times and costs if the Venetian blind is installed in an insulated glazing. In this case an additional hole has to be formed in the frame, with obvious and expectable consequences.

Furthermore, the addition of a wire will also lead to a more problematic installation by the electrician, who will have to consider an additional controller, in addition to the classical two wires.

U.S. Pat. No. 6,069,465 discloses a system with a two-wire line for controlling a blind. Nevertheless, the system as disclosed therein uses a circuit configuration that is complex and expensive for its technological context.

SUMMARY OF THE INVENTION

The object of the present invention is to provide a system for driving a Venetian blind that can improve prior art drive systems and particularly can ensure a more flexible and scalable use thereof.

This object is fulfilled according to the invention by a Venetian blind system as defined in claim 1.

Advantages of the Invention

In one embodiment, a system for driving a Venetian blind is provided, which can implement more complex drive controls, such as controlling the slat angle for Sun Tracking purposes, receiving blind state information or updating the firmware of the blind assembly circuitry, without requiring the provision of additional connection wires between the blind assembly and the control unit.

According to the present invention, it is possible to obtain a system for driving a Venetian blind whose installation is simpler and more scalable than prior art systems, and which does not require further installation works in addition to those that are already required for a prior art Venetian blind driving system.

BRIEF DESCRIPTION OF THE DRAWINGS

The characteristics and advantages of the present disclosure will appear from the following detailed description of a possible practical embodiment, illustrated as a non-limiting example in the set of drawings, in which.

DETAILED DESCRIPTION

Figure 1:
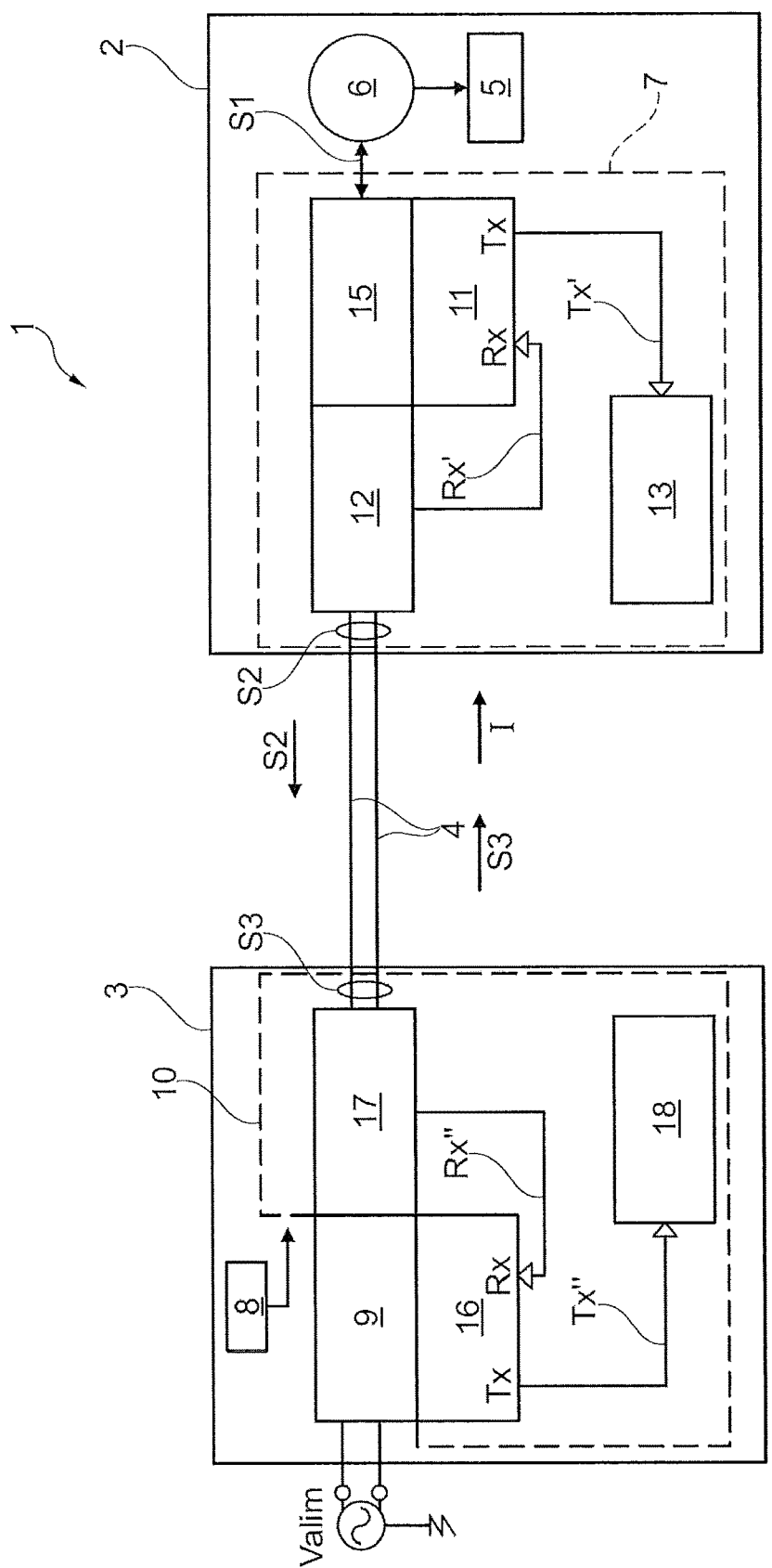
FIG. 1 shows a block diagram of the system for driving a Venetian blind according to the present invention.

Referring to the accompanying figures, numeral 1 generally designates a system for driving a Venetian blind.

The system for driving a Venetian blind 1 comprises a blind assembly 2 and a control unit 3, which are in signal communication with each other via a two-wire power line 4.

Particularly:

the blind assembly 2 comprises a Venetian blind 5, an electric motor 6 for actuating the movement of the Venetian blind 5 and first electronic means 7 configured to generate a drive signal S1 for driving the electric motor 6;

the control unit 3 comprises drive means 8 for driving the movement of said Venetian blind 5, a power source 9 for generating a Vdc signal to power the electric motor 6 and second electronic means 10 that are in signal communication the said drive means 8 and with said power source 9 for controlling said electric motor 6.

It shall be noted that the drive means 8 may be realized by digital inputs such as pushbuttons, analog inputs such as potentiometers or communication buses.

The power source 9 is mains powered with power supplies having a DC or AC voltage output; alternatively, the power source 9 may be realized as battery-powered systems with or without solar panels. Preferably, the power source is an AC/DC power source.

Particularly, also referring to the specific embodiment as shown in the accompanying figures, the power source 9 receives a mains voltage Valim to generate a DC voltage Vdc, e.g, 24 V, that can supply the electric motor 6 with a current I via the two-wire power line 4.

In order to transmit simple actuation controls, such as up or down movement, speed of such movement, etc. to the motor 6 of the blind 5 through the drive means 8, the first electronic means 7 are in signal communication with the second electronic means 10 via the two wires of the power line 4.

In a peculiar aspect of the present disclosure, in order to control/drive the electric motor 6 of the blind 5 with more complex drive controls, the signal communication between the first electronic means 7 and the second electronic means 10 only takes place via the two wires of the power line 4, i.e. does not require any additional wires for communication between said first and second electronic means 7, 10.

In one aspect of the present disclosure, the first electronic means 7 are designed to generate a first data signal S2, identifying the state of the electric motor 6, in the two-wire power line 4, and to detect the current signal I in the two-wire power line 4.

Particularly, the data signal S2 is indicative of the conditions of the blind 5, and hence the electric motor 6, whereas the current signal I is indicative of the change in the current value on the line 4.

In other words, the current signal I represents the change in the current absorbed by the electric motor 6 during its operation and, in particular, the current signal I changes in response to the change in the resistant torque generated by the blind 5 during its up/down movement/slat positioning/ jamming, etc.

The second electronic means 10 are configured to receive the first data signal S2 and to detect the current signal I and are configured to condition such first data signal S2 and the current signal I to thereby generate a second data signal S3.

It shall be noted that the data signal S3 represents the result of the conditioning and processing performed by the second electronic means 10 according to the value of the first data signal S2 and/or any additional drive controls that may be input by the user through the drive means 8 and/or any sensors (not shown) that may detect physical environmental parameters, such as temperature, brightness, etc.

Such data signal S3 is in turn transferred to the first electronic means 7 which are configured to receive and condition it in addition to the aforementioned current signal I, to generate the drive signal S1 as a function of the second data signal S3, i.e. its information contents.

Thus, a two-way communication is established between said first electronic means 7 and said second electronic means 10, with the signals S2, S3 and I being superimposed on the two-wire power line 4.

It shall be noted that a signal (not shown) may be sent from the second electronic means 10 to the first electronic means 7. Such signal is configured to enable the first electronic means 7 to generate the data signal S2 so as to configure the system 1 to operate for the transmission of more complex drive controls for handling the blind 5.

In one aspect of the present disclosure, the data signal S2 and the data signal S3 have their own frequency value, differing from a frequency value of the current signal I.

Particularly, for proper processing of such signals S2, S3 and I by the electronic means 7 and 10:
 the electronic means 7 comprise a first conditioning block 12 and
 the second electronic means 10 comprise a second conditioning block 17,
 the first and second conditioning blocks 12, 17 are configured to selectively condition the first data signal and the second data signal S2, S3, as well as the current signal I according to their respective frequencies.

In other words, the conditioning block 12 selectively conditions the data signal 3 and the current signal I, whereas the conditioning block 17 selectively conditions the data signal S2 and the current signal I.

For instance, the frequency value of the data signal S2 or the data signal S3 can change from a few to some tens of kilohertz whereas the frequency value of the current signal I can change from a few to some tens of Hertz.

It shall be noted that the frequency value of the current signal can change slowly from the few to some tens of Hertz, as the change in the resistant torque from the electric motor 6 can also change slowly.

More particularly, also referring to FIG. 1, the first electronic means 7 comprise a first conditioning block 12 and the second electronic means 10 also comprise a conditioning block 17.

In order to selectively condition the data signals S2, S3 and the current signal I, the conditioning block 12 comprises a first filter 12' and a first comparator 12" and likewise the second conditioning block 17 comprises a second filter 17' and a second comparator 17".

Preferably, the first or second filter 12', 17' is configured to be a filter of the first or second order, e.g. a low-pass filter, whereas the first or second comparator 12", 17" is configured to be a differential hysteresis comparator.

Particularly, in one aspect of the present disclosure, the first or second filter 12', 17' has such a cutoff frequency that such current signal I is filtered whereas the first data signal S2 and the second data signal S3 are allowed to pass, i.e. is not filtered.

Thus, a two-way asynchronous serial communication is established between the electronic means 7 of the blind assembly 2 and the electronic means 10 of the control unit 3.

The possibility of filtering the current signal I against the data signals S2, S3 affords the following features:
 receiving information about the state of the blind;
 updating the firmware of the electronic means 7 of the blind 5;
 sending "simple" movement actuation controls, generated by the drive means 8, to the blind 5, via the power line 4;
 sending "complex" movement actuation controls (e.g. for Sun Tracking), still via the power line 4.

With the aforementioned frequency values, i.e. a frequency of the data signals S2, S3 of the order of ten kilohertz, and a frequency of the current signal I ranging from a few to some tens of Hertz, and assuming a cutoff frequency of the filters 12' and 17 of about 40 Hz (i.e. considering a time constant of 3.6 msec of the conditioning blocks 12, 17) the data signals S2, S3 may be properly separated and routed with respect to the signal I.

Figure 3:
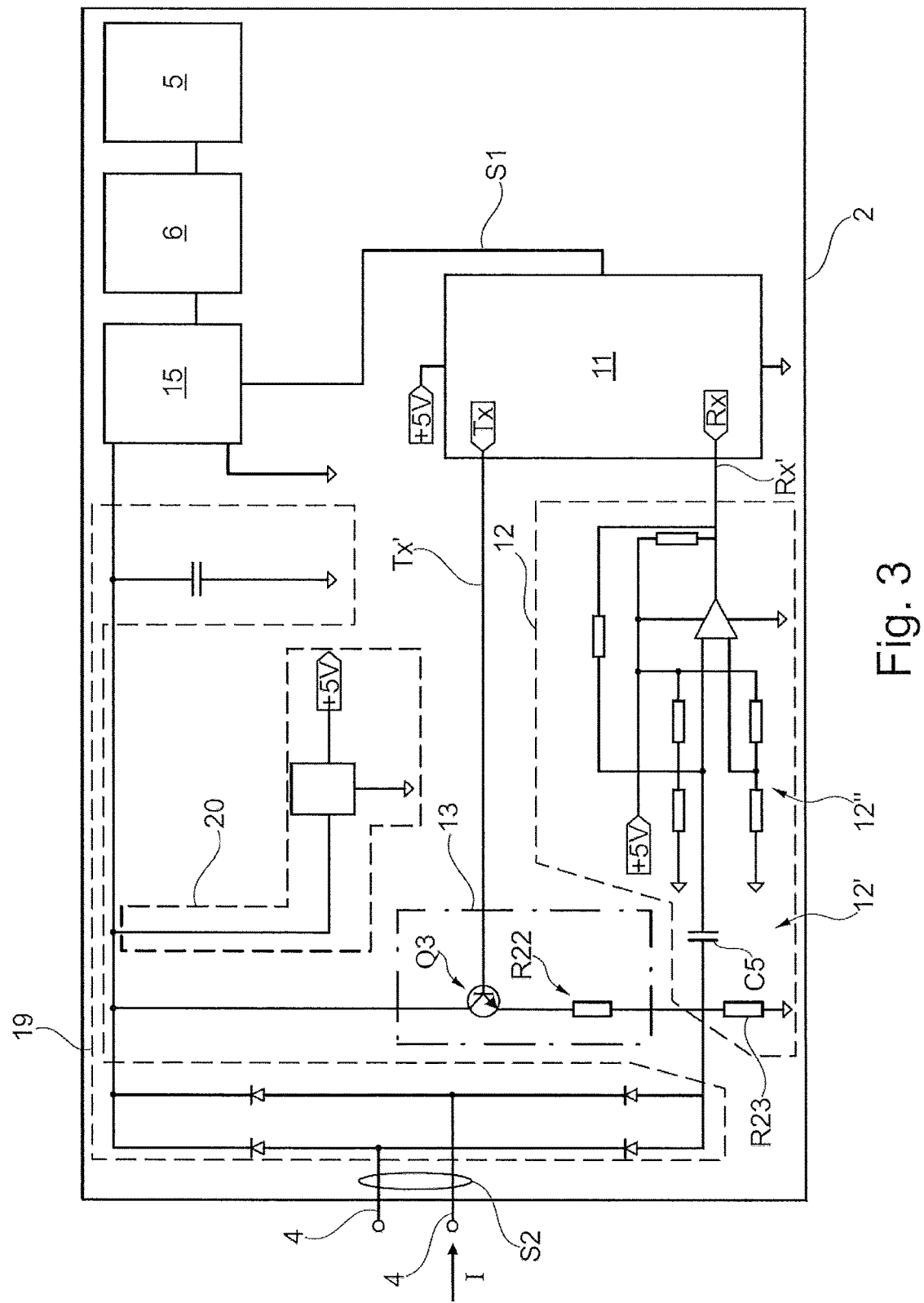
FIG. 3 shows a wiring block diagram of a blind assembly of the system for driving a Venetian blind of FIG. 1.

It shall be noted, also referring to FIGS. 1 and 3 that, for the conditioning process to be completed, in one embodiment of the present disclosure, the following is provided:

the first electronic means 7 comprise a first microcontroller 11 in signal communication with the conditioning block 12, with the electric motor 6 and with an amplifier 13;

the second electronic means 10 comprise a microcontroller 16 in signal communication with the conditioning block 17, with a pole-changing switch 21 and with an amplifier 18.

Particularly, the microcontroller 11 is configured to receive, through the conditioning block 12, a first processed signal Rx' which is a function of the data signal S3, to process it and generate a control signal Tx' which is provided at the input of the first amplifier 13, the latter being configured to generate the first data signal S2.

Particularly, the microcontroller 16 is configured to receive, through the conditioning block 17, a second processed signal Rx", which is a function of the data signal S3, to process it and generate a second control signal Tx" which is in turn provided at the input of the amplifier 18, the latter being configured to generate the data signal S3.

The electronic means 7 comprise a drive 15 which is configured to actuate the electric motor 6, such drive 15 being connected on one side with the microcontroller 11 to receive the drive signal S1 from the latter and on the other side with the electric motor 6.

The electronic means 7 comprise a rectifier 19 which is electrically connected on one side with the two-wire power line 4 and on the other side with the first conditioning block 12.

The electronic means 7 comprise a voltage regulator 20 which is electrically connected on one side with the rectifier 19 and on the other side with the drive 15.

In the specific embodiment of FIG. 3, which is given as a possible embodiment of circuit arrangement for the blind assembly 2, it is noted that:

the microcontroller 11 is supplied with a DC supply voltage, e.g. 5V, where the amplifier 13 comprises a BJT transistor Q3, whose base is connected with the microcontroller to receive the signal Tx' from the microcontroller 11, and whose emitter has a load resistor R22 and is connected with the conditioning block 12 and with the power line 4 and the collector is also connected with the power line 4;

the filter 12' has a capacitor C5 and a resistor R23, appropriately sized for the aforementioned filtering purposes;

the comparator 12" is a differential hysteresis comparator supplied with a predetermined DV voltage, e.g. 5V;

the rectifier 19 is implemented using a series of two diodes for each positive/negative pole of the two wires of the power line 4 (and hence for four diodes in diodes);

the voltage regulator 20 uses an integrated circuit, which is also supplied with a predetermined direct voltage, e.g. 5V.

Figure 2:
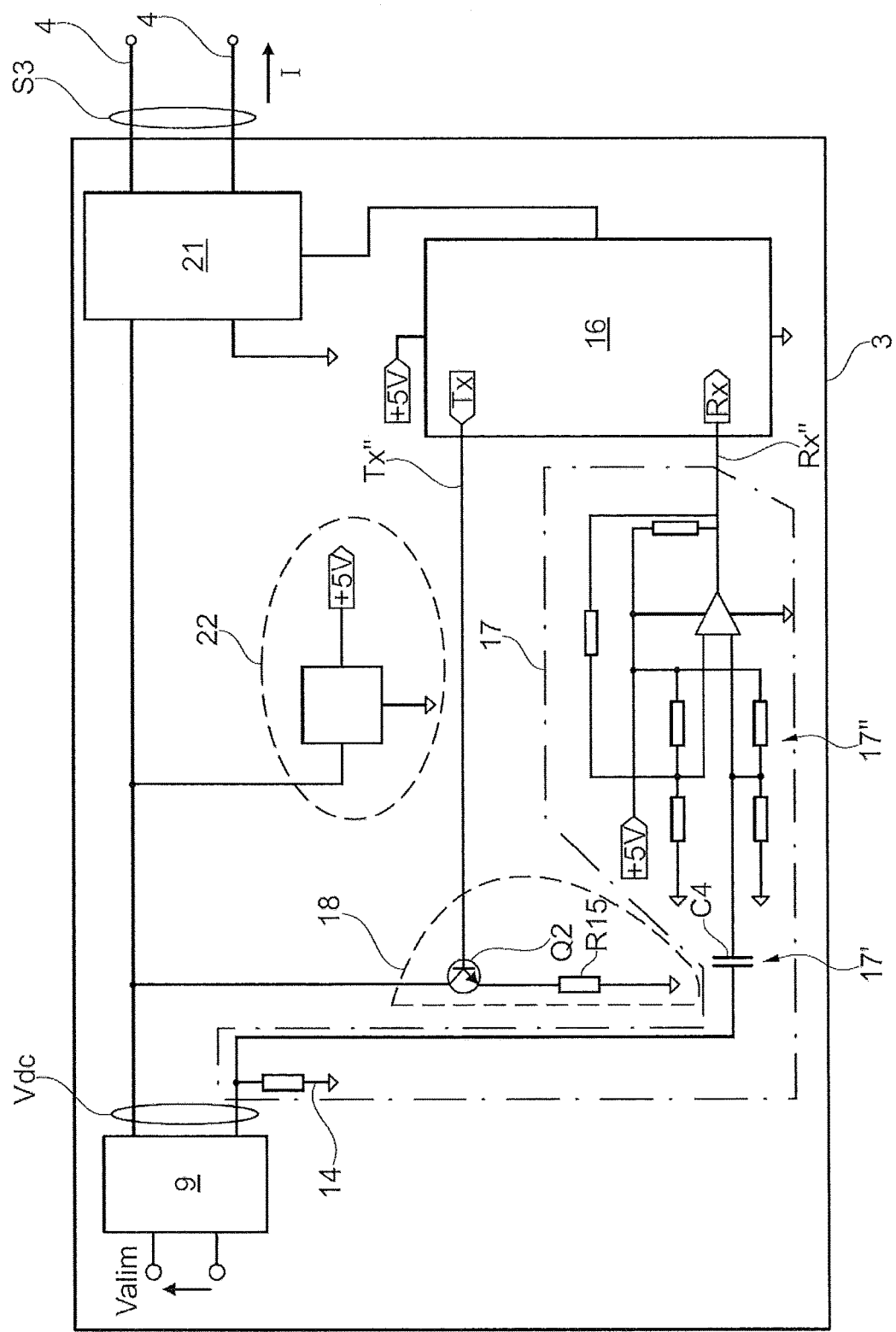
FIG. 2 shows a wiring block diagram of a control unit of the system for driving a Venetian blind of FIG. 1.

In the specific embodiment as shown in FIG. 2 it is noted that:

the microcontroller 16 is supplied with a supply voltage, e.g. 5 VDC, where the amplifier 18 comprises a BJT transistor Q2, whose base is connected with the microcontroller 16 to receive the data signal Tx", and whose emitter has a load resistor R15 and the collector is connected with the power line 4;

the filter 17' has a capacitor C4 and a resistor R14, appropriately sized for the aforementioned filtering purposes;

the comparator 17" is a differential hysteresis comparator supplied with a predetermined DV voltage, e.g. 5V;

the voltage regulator 22 uses an integrated circuit, which is also supplied with a predetermined direct voltage, e.g. 5V.

According to the operation principle of the two-way communication between the first electronic means 7 of the blind assembly 2 and those of the control unit 3, the amplifier 13 in the blind assembly 2 receives the signal Tx' to be transmitted to the electronic means 10 from the microcontroller 11, and generates the corresponding data signal S2 which is diverted by the filter 12' to the power line 4. The filter 17' of the control unit 3 receives this data signal S2 and the current signal I. Due to the settings of the conditioning block 17, the data signal S2 is allowed to pass, whereas the current signal I is conditioned by the filter 17', and after the passage through the comparator 17", the signal Tx" is generated and is in turn sent to the microcontroller 16.

Particularly, in the two-way transmission from the blind assembly 2 to the control unit 3, also referring to the circuit arrangement as shown in FIGS. 2 and 3, the microcontroller 11 transmits the Tx' data with logic levels, e.g. equal to 0-5V at the base of the BJT Q3. The circuit formed by R22 and Q3 converts the signal Tx' into the current data signal S2 that flows through the same R22-Q3 branch. This current data signal S2 splits between R23 and the power line 4, and also flows through the resistor in the controller R14. Since the resistor R23 is set to the same value of the resistor R14, the signal is equally split, whereby both the digital current data signal S2 corresponding to the signal Tx' and the current signal I are sent to the control unit 3. The resistance of R14 converts this current data signal S2 into a voltage signal which is sent to the conditioning block 17 to obtain the signal Rx" with levels, e.g. equal to 0-5V to be sent to the microcontroller 16 of the control unit 2. Since the conditioning block 17 comprises the filter 17 and the comparator 17", the data signal S2 passes through the filter, whereas the signal Tx" associated with the operation current of the motor 6 is filtered, because it changes slowly.

The same mechanism applies to the transmission from the control unit 3 to the blind assembly 2, where the amplifier 18 receives the signal Tx" to be transmitted to the electronic means 7 of the blind assembly, from the microcontroller 16. For this purpose, the microcontroller 16 generates the corresponding data signal S3 which is diverted by the filter 17' to the power line 4, with the current signal I. The filter 12' receives the data signal S3 and the current signal I, conditions them in accordance with the rules of the filter 12' and the comparator 12", and outputs the data Rx' received from the control unit 3, which is sent to the microcontroller 11 of the blind assembly 2.

Particularly, also referring to the circuit arrangements of FIGS. 2 and 3, the microcontroller 16 transmits the Tx" data to the amplifier 18 with logic levels, e.g. equal to 0-5V at the base of the BJT Q2. The circuit formed by R15 and Q2 converts the signal Tx" into the current data signal S3 that flows through the same R15-Q2 branch. This current control signal S3 splits between the resistor R14 and the power line 4, and also flows through the resistor R23 in the blind assembly 2. Since the resistor R23 is set to the same value of the resistor R14, the signal is equally split, whereby both the digital current data signal S3 corresponding to the data signal Tx" of the microcontroller 16 of the control unit 3 is sent to the blind assembly 2. The resistor R23 converts this signal into the voltage signal that is sent to the comparator block 12 to obtain the signal Rx' with levels, e.g. equal to 0-5V to be sent to the microcontroller 11 of the blind assembly 2.

Those skilled in the art will obviously appreciate that a number of changes and variants as described above may be made to fulfill particular requirements, without departure from the scope of the invention, as defined in the following claims.

The invention claimed is:

1. A system for driving a Venetian blind comprising:
   a blind assembly comprising a Venetian blind, an electric motor for actuating the movement of said Venetian blind and first electronic means configured to generate a drive signal for driving said electric motor;
   a control unit having drive means for driving the movement of said Venetian blind, a power source for generating a current signal to power said electric motor and second electronic means that are in signal communication with said drive means and with said power source for controlling said electric motor;
   a two-wire power line disposed between said control unit and said blind assembly to power said electric motor with said current signal;
   said first electronic means are in signal communication with said second electronic means via said two-wire power line;
   characterized in that:
   said first electronic means are configured to generate a first data signal identifying the state of said electric motor and to detect said current signal in said two-wire power line identifying the current value absorbed by said electric motor;
   said second electronic means are configured to receive said first data signal and to filter it against said current signal, said second electronic means are configured to process said first data signal and said current signal to thereby generate a second data signal, wherein said first data signal and said second data signal have their own frequency value, differing from a frequency value of said current signal;
   said first electronic means are configured to receive said second data signal, to filter it against said current signal and to process it to thereby generate said drive signal.

2. A system for driving a Venetian blind as claimed in claim 1, said first electronic means comprise a first conditioning block and said second electronic means comprise a second conditioning block, said first and said second conditioning blocks are configured to selectively condition said first data signal and said second data signal and said current signal according to their respective frequency value.

3. A system for driving a Venetian blind as claimed in claim 2, wherein said frequency value of said first data signal and said second data signal ranges from a few to some tens of kilohertz whereas the frequency value of said current signal ranges from a few to some tens of Hertz.

4. A system for driving a Venetian blind as claimed in claim 2, wherein said first conditioning block comprises a first filter and a first comparator and said second conditioning block comprises a second filter and a second comparator.

5. A system for driving a Venetian blind as claimed in claim 4, wherein said first or second filter is configured to be a filter of the first or second order.

6. A system for driving a Venetian blind as claimed in claim 4, wherein said first or second filter has such a cutoff frequency that said current signal is filtered and said first data signal and said second data signal are allowed to pass.

7. A system for driving a Venetian blind as claimed in claim 4, wherein said first or second comparator is configured to be a differential hysteresis comparator.

8. A system for driving a Venetian blind as claimed in claim 3, wherein:
   said first electronic means comprise a first microcontroller in signal communication with said first conditioning block, with said electric motor and with a first amplifier, said first microcontroller is configured to receive, through said first conditioning block, a first processed signal which is a function of said second data signal and to generate a first control signal which is provided at the input of said first amplifier, the latter generating said first data signal;
   said second electronic means comprise a second microcontroller in signal communication with said second conditioning block, with a pole-changing switch and with a second amplifier, said second microcontroller is configured to receive a second processed signal through said second conditioning block, which is a function of said first data signal, and to generate a second control signal which is provided at the input of said second amplifier the latter generating said second data signal.

9. A system for driving a Venetian blind as claimed in claim 8, wherein said first electronic means comprise a driver configured to actuate said electric motor, said driver being connected on one side with said first microcontroller to receive said drive signal from the latter and on the other side with said electric motor.

10. A system for driving a Venetian blind as claimed in claim 8, wherein said first electronic means comprise a rectifier electrically connected on one side with said two-wire power line and on the other side with said first conditioning block.

* * * * *